C. H. McKENDREE.
DEMOUNTABLE RIM.
APPLICATION FILED AUG. 7, 1915.

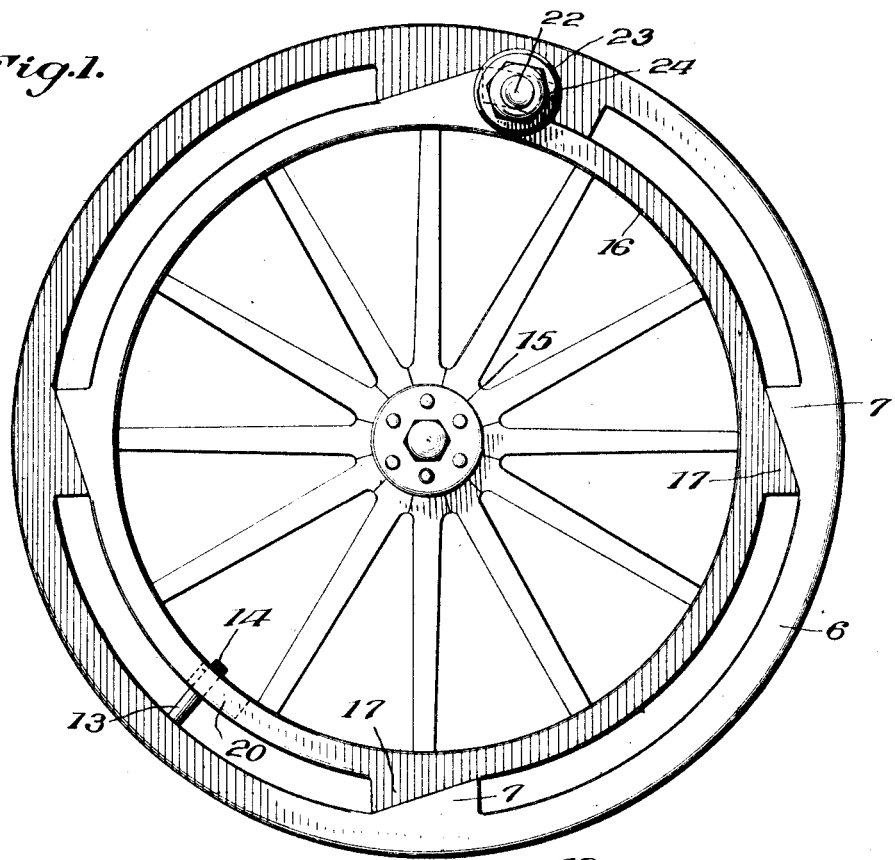
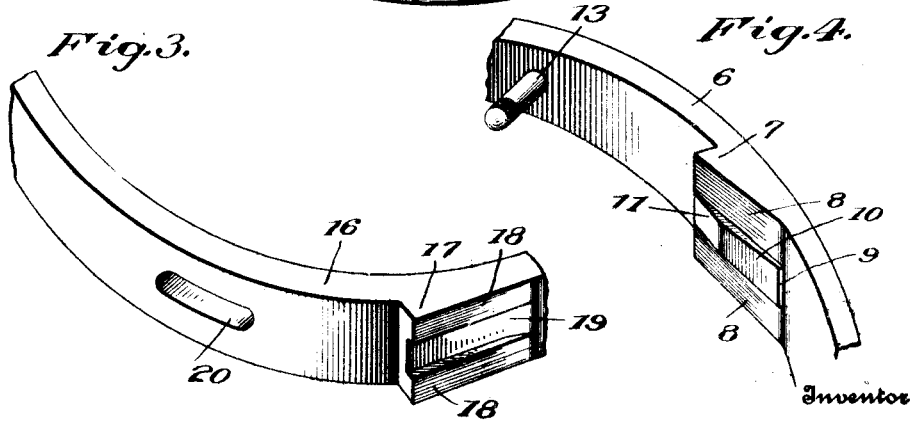

1,172,242.

Patented Feb. 15, 1916.
2 SHEETS—SHEET 2.

Witness

Inventor

UNITED STATES PATENT OFFICE.

CREED H. McKENDREE, OF LAKEVIEW, OREGON, ASSIGNOR OF ONE-TENTH TO E. H. SMITH, ONE-TENTH TO F. P. LANE, ONE-TENTH TO W. A. MASSINGILL, ONE-TENTH TO C. D. ARTHUR, AND ONE-TENTH TO MANUEL SANDERS, ALL OF LAKEVIEW, OREGON.

DEMOUNTABLE RIM.

1,172,242. Specification of Letters Patent. Patented Feb. 15, 1916.

Application filed August 7, 1915. Serial No. 44,336.

*To all whom it may concern:*

Be it known that I, CREED H. MCKENDREE, a citizen of the United States, residing at Lakeview, in the county of Lake and State of Oregon, have invented certain new and useful Improvements in Demountable Rims, of which the following is a specification.

This invention relates to demountable rims, and more particularly to that class of such devices adapted to sustain any form of tread or tire upon a wheel and in such manner as to be readily applied to and removable from the wheel.

The primary object of this invention is to provide a demountable rim which shall embody positive means for securely holding the rim proper upon the wheel without the use of complicated or unsightly locking means.

A further object of this invention is to provide a device of the character set forth with means whereby the demountable rim is placed upon the wheel in such manner that the rotation of the wheel will tend to tighten the demountable rim upon the wheel.

A still further object of this invention is to provide means carried by the demountable rim adapted to so engage means carried by the wheel as to prevent transverse movement of the rim with relation to the wheel.

With these and other objects in view as will hereinafter appear, this invention consists in the combination of various related parts and elements of a demountable rim as hereinafter set forth, and more particularly pointed out in the appended claim.

Figure 2:
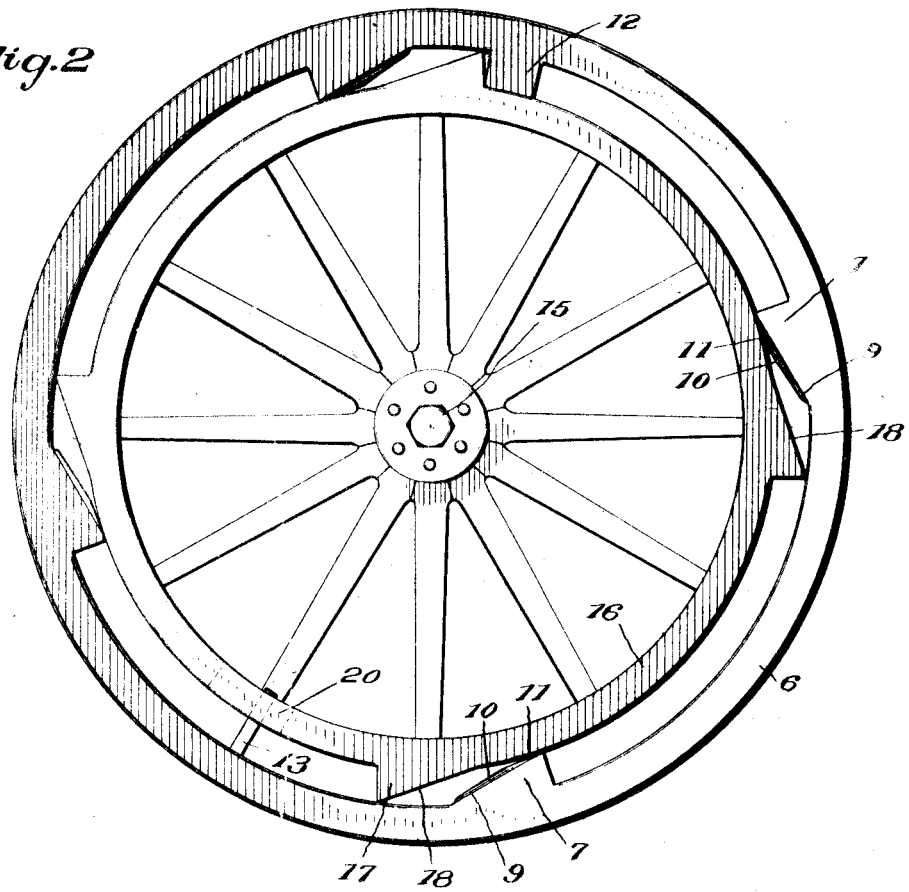
Figure 5:
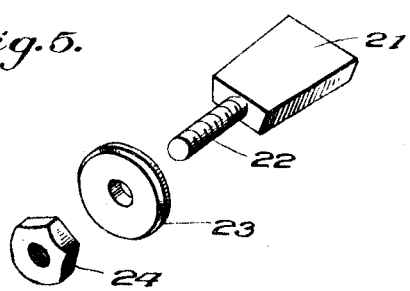

Referring to the drawings forming a portion of this specification and illustrating the preferred embodiment of this invention and in which the same reference characters indicate the same parts wherever used, Figure 1 is an elevation of the wheel showing the rim in locked position thereon; Fig. 2 is an elevation of the wheel showing the rim in unlocked position ready for removal; Fig. 3 is a detail perspective of one of the locking members carried by the wheel; Fig. 4 is a detail perspective of one of the locking members carried by the demountable rim, and Fig. 5 shows the device for locking the demountable rim against removal from the wheel.

The numeral 6 designates an annular ring formed of any suitable material, which may be provided with means for holding any suitable tire or tread member, not shown. Upon the inner portion of the ring 6 and preferably formed integral therewith are a plurality of projections 7 provided with suitably inclined faces 8, 8, which are divided by a raised member 9 having a portion of its upper surface flattened at 10, and a further portion inclined at 11 in a direction opposite to the incline of the faces 8, 8 of the member 7. Any desired number of these members may be placed upon the inner portion of the ring 6.

Adjacent one of the members 7 is provided a small block 12 preferably formed integral with the ring 6 and extending across the inner face thereof. The ring 6 is further provided with a cylindrical member 13 provided with a knurled cap 14 adapted to receive the valve stem of a pneumatic tire placed upon the ring 6 when it is desired to use the device with such tire.

15 designates a wheel of any suitable type provided with a rim 16 having formed integral therewith a plurality of members 17 having inclined faces 18, 18, divided by a central depression 19 inclined in the same direction as the faces 18. The angle of inclination of the members 17 of the rim 16 is opposite to that of the faces 8 of the member 7 upon the demountable rim 6. A slot 20 is provided in the rim 16 in order to permit the valve stem housing 13 to project therethrough when moved freely therein.

The device is assembled as follows: The valve stem housing 13 is placed within the slot 20 of the rim 16 of the wheel 15 and the demountable rim 6 brought over the periphery of the wheel as shown in Fig. 2 in such position as to cause the central projections 9 of the member 7 upon the demountable rim 6 to engage the depressions 19 of the member 17 upon the rim 16, whereupon by turning the demountable rim in a clockwise direction the members 9 will engage the slots 19. The faces 8, 8 of the members 7 will engage and ride up on the faces 18, 18 of the member 17 until the parts reach the position shown in Fig. 1. When the parts are in this position a locking device comprising a wedge member 21 provided with a threaded extension 22 is placed between the block 12 and the adjacent member 7 and its engaging member 17, where by means of a washer 23 and a nut 24 adapted to engage the threaded portion 22, a sufficient tightening of the wedge member 21 may be obtained to lock the parts of the wheel and rim together.

The inclined portion 11 of the member 9 reduces the height of the member 9 at the end of the member 7 where such member 7 reaches its highest point, thus permitting the rim therein positioned to be assembled and slide transversely across the narrow portion of the faces 18, 18 of the member 17, thus permitting of easy adjustment and replacement of the demountable rim. Any transverse movement of the demountable rim upon the rim of the wheel is prevented by the engagement of the members 9 with the slots 19. Rotary movement in a clockwise direction of the demountable rim about the wheel only serves to tighten the demountable rim upon the wheel. The faces 8, 8 moving upwardly upon the oppositely inclined faces 18, 18 thus lock the device in position. Any counter clockwise movement of the demountable rim upon the rim proper which could occur by reverse movement of the vehicle to which the wheels are attached is prevented by the locking wedge 21, which may be taken up by the nut 24 in order to insure a tight engagement at all times.

Without further analysis the foregoing will so fully reveal the gist of this invention that others can by applying current knowledge readily adapt it for various applications without omitting certain features that, from the standpoint of the prior art, fairly constitute essential characteristics of the generic or specific aspects of this invention, and therefore such adaptations should and are intended to be comprehended within the meaning and range of equivalency of the following claim.

Having thus described my invention what I claim as new and desire to secure by Letters Patent is:

In a wheel, the combination with a wheel rim, of a plurality of members on said wheel rim, each member comprising a plurality of inclined faces divided by a central depression inclined in the same direction, a demountable rim provided with a plurality of members, each member comprising a plurality of faces inclined oppositely to said wheel rim members, said faces being divided by a raised central portion inclined in the same direction for a portion of its length and reversely inclined to the adjacent faces for the remainder of its length, the wheel rim members and the demountable rim members being adapted to engage each other to hold the demountable rim in place upon the wheel.

In testimony whereof I affix my signature in presence of two witnesses.

CREED H. McKENDREE.

Witnesses:
J. K. MOORE,
F. L. BROWNE.